US008683559B2

(12) United States Patent
Wu

(10) Patent No.: US 8,683,559 B2
(45) Date of Patent: Mar. 25, 2014

(54) METHOD AND SYSTEM OF SERVING SUBSCRIBED CONTENTS FROM MULTIPLE SOURCES VIA A GLOBAL COMMUNICATIONS NETWORK

(75) Inventor: Wenqing Wu, Carlsbad, CA (US)

(73) Assignee: Exceedland Incorporated, Carson City, NV (US)

( * ) Notice: Subject to any disclaimer, the term of this patent is extended or adjusted under 35 U.S.C. 154(b) by 254 days.

(21) Appl. No.: 13/087,389

(22) Filed: Apr. 15, 2011

(65) Prior Publication Data

US 2011/0214170 A1 Sep. 1, 2011

(51) Int. Cl.
G06F 7/04 (2006.01)
G06F 15/16 (2006.01)

(52) U.S. Cl.
USPC ..................... 726/5; 726/8; 726/12

(58) Field of Classification Search
USPC .................................. 726/5, 8, 12
See application file for complete search history.

(56) References Cited

U.S. PATENT DOCUMENTS 6,691,070 B1 * 2/2004 Williams et al. ............. 702/188
8,090,877 B2 * 1/2012 Agarwal et al. .............. 709/246
2002/0054080 A1 * 5/2002 Belanger et al. ............. 345/738
2003/0061404 A1 * 3/2003 Atwal et al. .................. 709/328
2003/0126605 A1 * 7/2003 Betz et al. ...................... 725/39
2003/0172136 A1 * 9/2003 Katagawa et al. ............ 709/220
2008/0126476 A1 * 5/2008 Nicholas et al. .............. 709/203
2008/0167970 A1 * 7/2008 Nissim ............................ 705/26

* cited by examiner

Primary Examiner — William Powers

(57) ABSTRACT

A computer implemented method and system for, via a global communications network, serving subscribed contents from various subscribed content sources to end users without the need of end users subscribing and signing in at each individual subscribed content source. An embodiment system of present invention may use pre-stored access credentials specific to the embodiment system for fetching the requested subscribed contents from various subscribed content sources. The embodiment system may remove the aforementioned access credentials when forwarding the fetched subscribed contents to corresponding requesting end users. The end users may be served according to their viewing credits and other permissions. The viewing credits of end users may be adjusted according to the served subscribed contents. Before being forwarded to end users, the fetched subscribed contents may be amended according to the present invention to facilitate end users for requesting further subscribed contents to be served by the embodiment system.

42 Claims, 8 Drawing Sheets

METHOD AND SYSTEM OF SERVING SUBSCRIBED CONTENTS FROM MULTIPLE SOURCES VIA A GLOBAL COMMUNICATIONS NETWORK

FIELD OF THE INVENTION

The present invention relates to the field of global communications network information retrieval and delivery, more specifically to systems and methods for serving subscribed contents from various sources to consuming end users without requiring end users to subscribe and sign in at each individual subscribed content source. The present invention also relates to systems and methods for adjusting the viewing credits of end users based on the served subscribed contents.

BACKGROUND OF THE INVENTION

Global communications networks, such as, for example, the internet, have grown exponentially and, as such, information available via global communications networks have also grown. As the internet has gained popularity to become one of the largest computer networks in existence to connect the world together, internet has become an important vehicle for users to obtain and use information, knowledge, social connections and tool facilities.

As a way of revenue generation and audience control, some contents or services delivered via global communications networks require subscription for accesses. As a result, end users are required to subscribe at each individual subscription source they intend to access. To access the subscribed contents, end users are also required to sign in at each individual subscription based web site. Therefore it is cumbersome for end users to access subscribed contents from multiple subscription-based sources.

Furthermore, the effective cost per view may also be uneconomically high to those end users who only read the subscribed contents occasionally and sparsely, thus spontaneous readerships are discouraged by the subscription-based paid content serving model. In addition, an individual end user is also unlikely to subscribe at many paid content sources as the subscription cost adds up quickly. As a result, typical end users are limited to paid contents from a small selection of subscribed content sources, while the full revenue potential cannot be realized by paid subscription providers due to these aforementioned barriers that prevent large user base from being reached.

SUMMARY OF THE INVENTION

In view of the foregoing, it is therefore an object of the present invention to, among other things, provide a mechanism for serving subscribed contents from multiple subscribed content sources without the need of end users making subscription and signing in at each individual subscribed content source. In doing so, the method and system revealed by present invention reduce the effective cost per view for those end users who only read the subscribed contents occasionally and sparsely. The method and system revealed by present invention also allow end users to conveniently and economically access subscribed contents from a large selection of subscribed content sources, which would otherwise be unpractical. The providers of subscribed contents can also benefit from present invention with expanded user base.

The present invention advantageously allows an embodiment system of a set of computer servers, global communication network connections, and operating method reveal by present invention to serve subscribed contents from various subscribed content sources to requesting end users without the need of end users subscribing and signing in at each requested subscribed content source.

The embodiment system may authenticate end users with a sign-in process specific to the system. The requests for the subscribed contents from authenticated end users may be served by the embodiment system based on the viewing credits and viewing permissions of the authenticated requesting end users. To serve the requests for subscribed contents from authenticated end users with sufficient viewing credits and viewing permissions, the embodiment system may forward the requests for subscribed contents to appropriate subscribed content sources along with corresponding access credentials specific to the embodiment system for successful fetching of the requested subscribed contents. These access credentials may be obtained as needed and updated from time to time with automatic processes for the embodiment system to sign in at each requested subscribed content source. The embodiment system may need to make subscriptions and agreements with the subscribed content sources from which the embodiment system intends to serve subscribed contents. These access credentials may also be obtained via pre-agreements between the operators of the embodiment system and the providers of the subscribed contents. These access credentials may be in the form of Hyper Text Transfer Protocol (HTTP) cookies.

Once the requested subscribed contents are fetched successfully by the embodiment system, the access credentials for the embodiment system to successfully fetch subscribed contents may be removed before forwarding the fetched subscribed contents to end users, hence preventing end users from obtaining the same direct accessibilities as the embodiment system for accessing the request subscribed content sources.

Before forwarding the successfully fetched subscribed contents to corresponding requesting end users, the embodiment system may amend the fetched subscribed contents by replacing the global communication addresses for direct accessing of the subscribed content sources with the global communication addresses for indirect accessing of the subscribed content sources which route the access requests through the embodiment system. These global communication addresses may be in the form of Uniform Resources Locators (URLs).

Also prior to forwarding the successfully fetched subscribed contents to corresponding requesting end users, the embodiment system may amend the fetched subscribed contents with additional user interface elements for allowing end users to generate requests for related subscribed contents. The user interface elements may be in the form of Hyper Text Markup Language (HTML) links, buttons and menu choices. The user interface elements may also be in the form browser buttons and menu choices.

Upon deemed successful serving of the requesting subscribed contents, the embodiment system may also adjust the viewing credits of the authenticated requesting end users based on the requested subscribed contents.

BRIEF DESCRIPTION OF THE DRAWINGS

The accompanying drawings found in the attachments are presented to aid in the description of embodiments of the invention and are provided solely for illustration of the embodiments and not limitation thereof.

DETAILED DESCRIPTION OF THE PREFERRED EMBODIMENT

Figure 1:
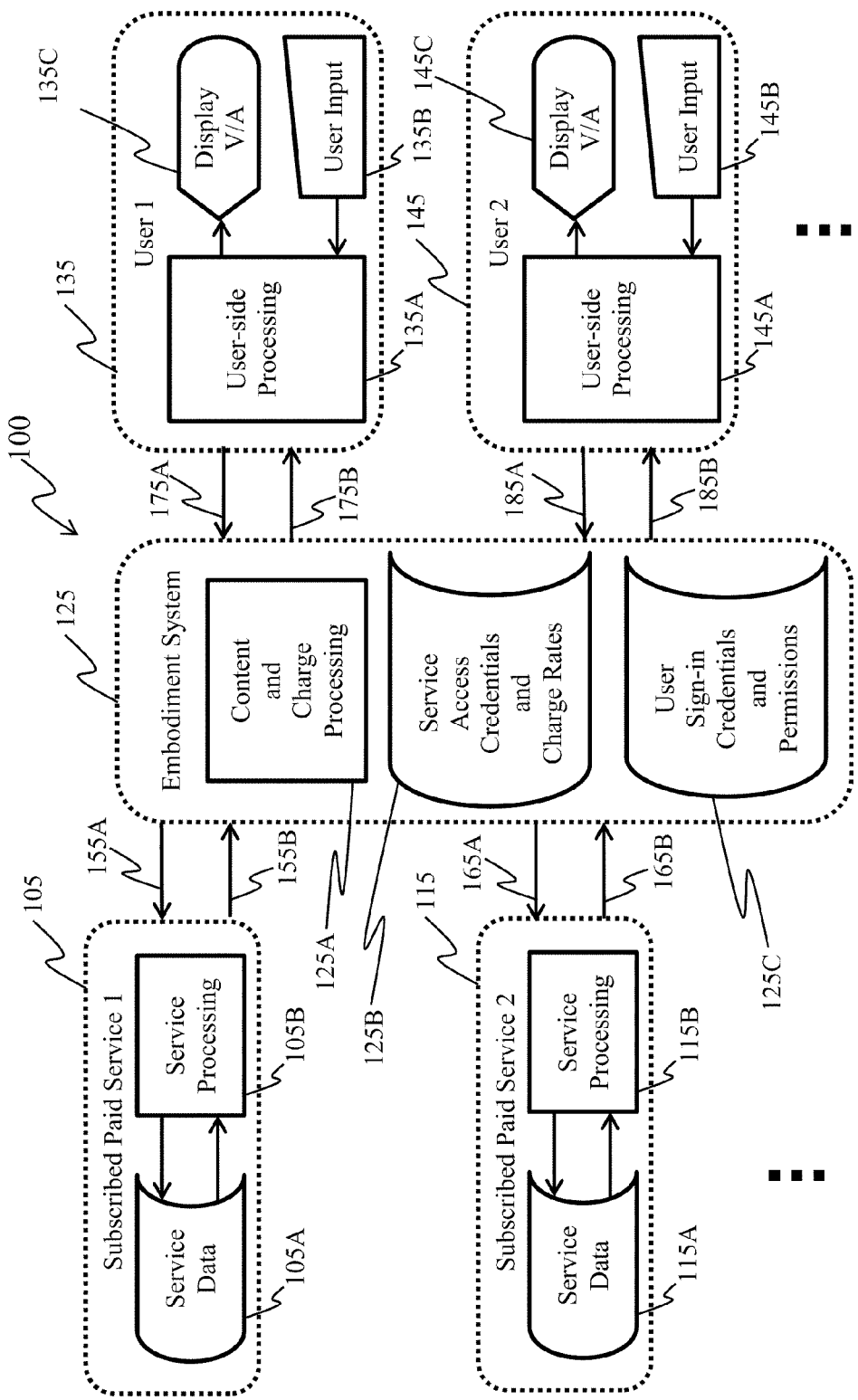
FIG. 1 is a block diagram showing an embodiment system of present invention in relations to multiple subscribed services which provide subscribed contents and plural end users for requesting and consuming subscribed contents. Throughout this document, "subscribed content sources" is used interchangeably with "subscribe services".

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Additionally, well-known elements of the invention will not be described in detail or will be omitted so as not to obscure the relevant details of the invention. Like numbers refer to like elements throughout, and prime and multiple prime notations, when used, refer to similar elements in alternate embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, phase change memory, magnetic memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for implementation. Accordingly, the invention is not limited to illustrated examples and any means for performing the functionality described herein are included in embodiments of the invention.

Described herein is a method and system for, via a global communications network, serving subscribed contents from multiple subscribed content sources without the need of end users making subscription and signing in at each individual subscribed content source. The method and system revealed by present invention advantageously reduce the effective cost per view for those end users who only read the subscribed contents occasionally and sparsely, thus encourage the readership of subscribed contents from such end users. In addition the method and system revealed by present invention facilitate end users for convenient and economical accessing of subscribed contents from a large selection of subscribed content sources which would otherwise be unpractical. The providers of subscribed contents may also benefit from present invention with the expanded user bases allowed by present invention.

Referring to the drawings, FIG. 1 shows overall system structures and relations 100 for one exemplary embodiment system 125 of the present invention, subscribed content sources 105 and 115 from which the exemplary embodiment system serves subscribed contents, and end users 135 and 145 to whom the exemplary embodiment system serves subscribed contents. The exemplary embodiment system 125 contains access credentials 125B which allow the embodiment system 125 to successfully fetch subscribed contents from the subscribed content sources 105 and 115. User sign-in credentials 125C may also be stored in the embodiment system 125. The system operating method revealed by present invention may be implemented in the computing device 125A, which may be just an ASIC processor, or may be computer servers. The end users 135 and 145 may sign in the embodiment system 125. The embodiment system 125 may authenticate them with the sign-in credentials in 125C. The embodiment system 125 may also check the permissions of the end users 135 and 145 with the permission records in 125C. The end users 135 and 145 may send, via global communication network connections 175A and 185A, requests for subscribed contents to the embodiment system 125. Sending along with the appropriate access credentials in 125B, the embodiment system 125 may forward the received requests, via global communication network connections 155A and 165A, to the appropriate subscribed content sources 105 and 115. The embodiment system 125 may then retrieve the requested subscribed contents, via global communication network connections 155B and 165B, from the corresponding subscribed content sources 105 and 115. After appropriate amendment of the retrieved subscribed contents such as access credential removal and URL replacement, the embodiment system 125 may then present the amended retrieved subscribed contents, via global communication network connections 175B and 185B, to the corresponding requesting end users 135 and 145. The global communication network mentioned herein may be Internet or cellular network. The embodiment system 125 may need to make subscriptions at the subscribed paid services 105 and 115. The embodiment system 125 may also need to make appropriate agreement with the providers of the subscribed paid services 105 and 115. The embodiment system 125 may obtain the access credentials 125B for accessing the subscribed content sources 105 and 115 in the form of HTTP cookies. These HTTP cookies can be obtained as needed and updated from time to time with automatic signing in processes for the embodiment system 125 to sign in at corresponding subscribed content sources 105 and 115. The embodiment system 125 may also obtain the credentials for accessing subscribed content sources 105 and 115 via pre-arrangements with the providers of the corresponding subscribed content services 105 and 115.

Figure 2:
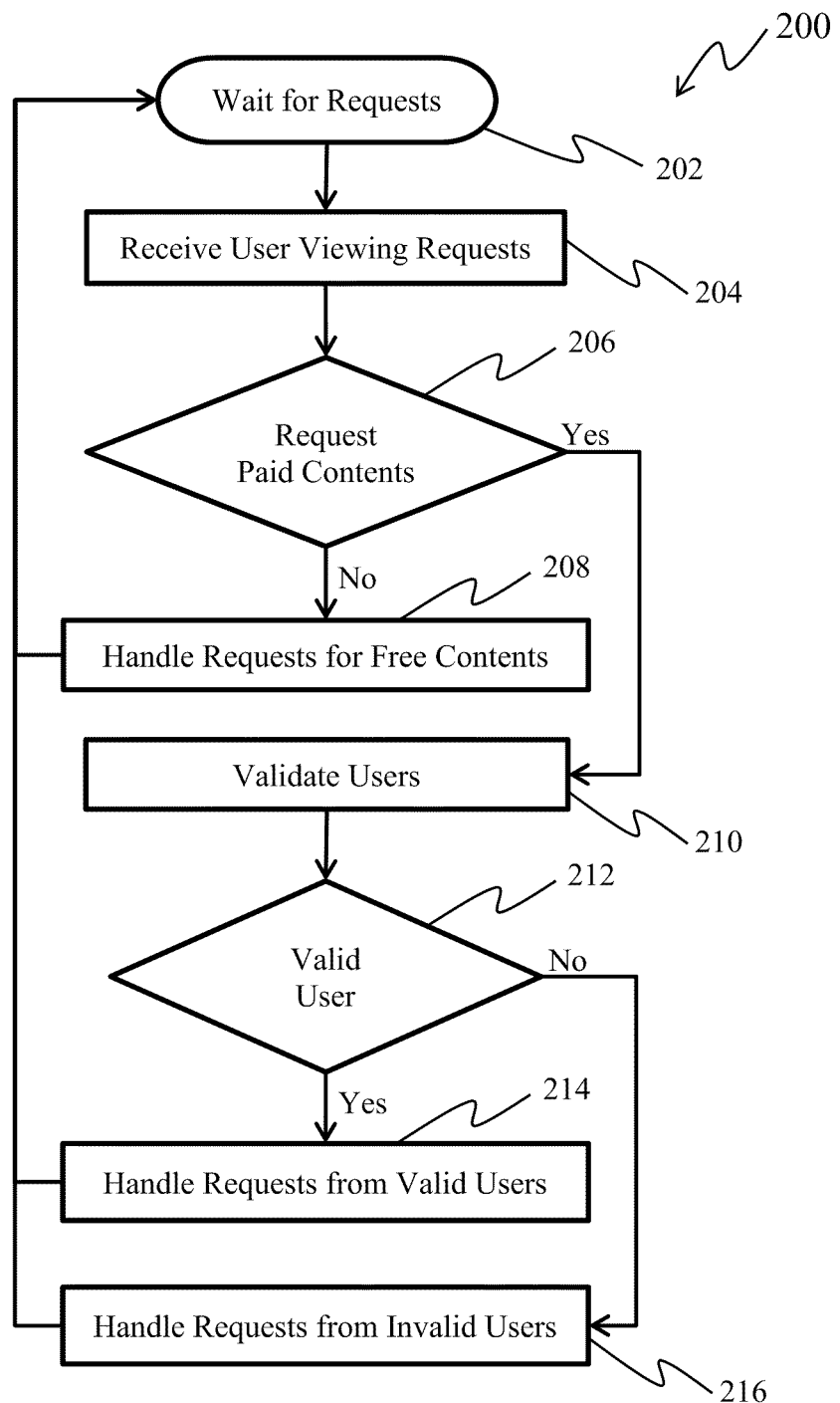
FIG. 2 is a flowchart illustrating an overall process of handling requests from end users for subscribed contents.

Referring to FIG. 2, flowchart 200 depicts the overall processing of how requests for subscribed contents from end users 135 and 145 are served by the embodiment system 125. In a standby state, the embodiment system 125 may wait for end user requests for subscribed contents in process 202. Once the requests for subscribed contents are received from end users in process 204, the requests may be checked in 206 to see if the requested subscribed contents are free of charge. If the requested subscribed contents are free of charge, then the requests may be served in process 208. Otherwise, if the requested subscribed contents require payment, which may be in the form of viewing credit deduction, the requesting users may be checked in process 210 and 212 to see they are valid users for the requested subscribed contents. If the requesting users are found to be valid users for the requested subscribed contents, their requests may be served in process 214. The requests for subscribed contents from invalid users may be served in process 216. After serving the requests for subscribed contents from end users 135 and 145, the embodiment system 125 may go back to the standby state 202.

Figure 3:
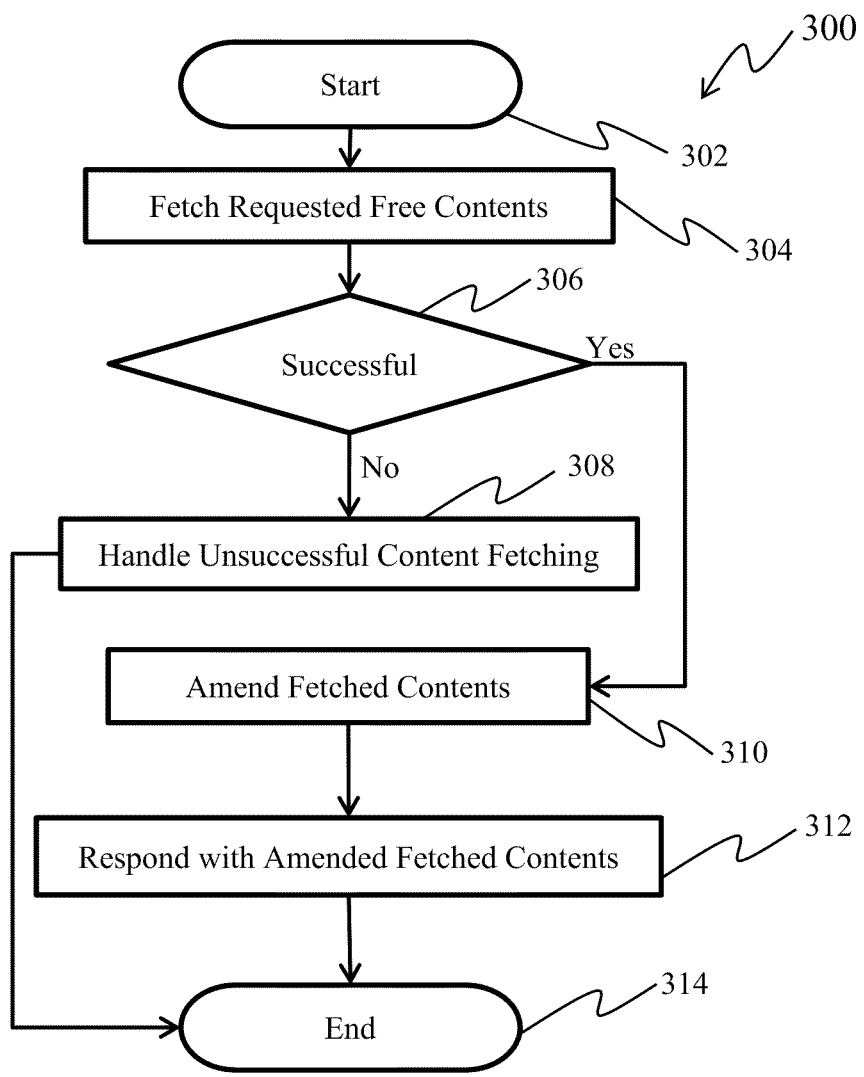
FIG. 3 is a flowchart for a process of handling requests from end users for free subscribed contents.

Referring now to FIG. 3, the overall processing of serving free subscribed contents is depicted in flowchart 300. The embodiment system 125 may start the processing at 302. Using appropriate access credentials for the embodiment system 125 to access the corresponding sources of the requested subscribed contents, the embodiment system 125 may proceed to fetch the requested subscribed contents in process 304. If the retrieval of the requested subscribed contents is deemed to be not successful in 306, the embodiment system 125 may handle the requests with unsuccessful subscribed content retrieval in process 308. If the retrieval of the requested subscribed contents is deemed to be successful in 306, the embodiment system 125 may amend the fetched subscribed contents in process 310. To avoid the requesting end users from obtaining the direct accessibility to the subscribed content sources as the embodiment system 125, the HTTP cookies that serve as access credentials to the subscribed content sources may be removed from the successfully retrieved subscribed contents. The URLs in the successfully retrieved subscribed contents for direct access by end users to the subscribed contents sources may be replaced with corresponding proxy URLs so that the access by end users to the subscribed content sources may go through the embodiment system 125 for the processing as depicted in flowchart 200 in FIG. 2. Addition user interface elements such as those shown in FIG. 7 through FIG. 10 may also be added to the fetched subscribed contents. The embodiment system 125 may finally serve the requests from end users for subscribed contents in process 312 by presenting the amended subscribed contents to the corresponding requesting end users.

Figure 4:
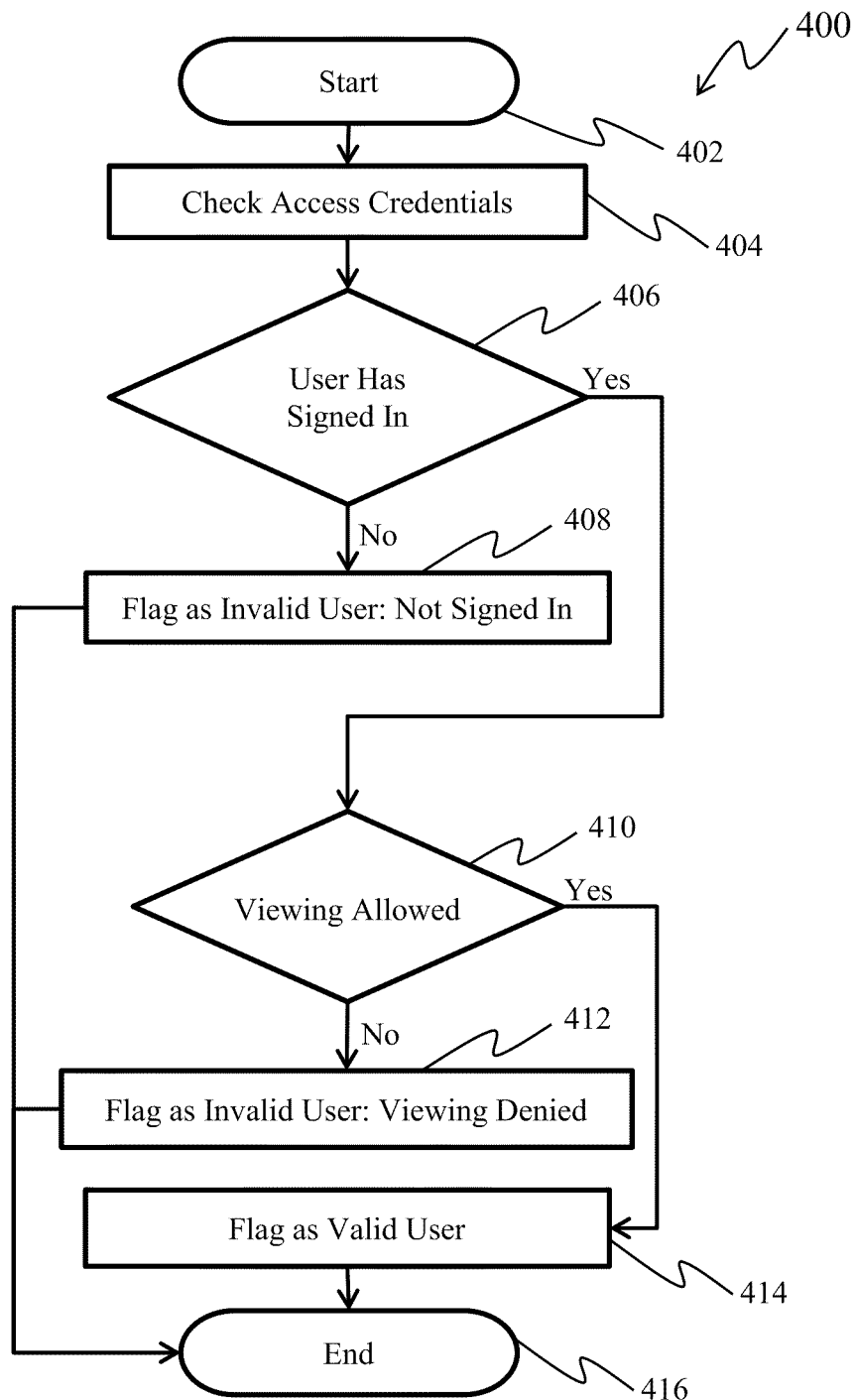
FIG. 4 is a flowchart illustrating a process for validating end users for paid subscribed content serving with end user authentication and permission checking.

Referring now to FIG. 4, flowchart 400 depicts one exemplary processing of process 210 in FIG. 2 for discerning if an end user is a valid user for the requested subscribed contents. For this discerning process, the embodiment system 125 may start processing at 402. The embodiment system 125 may proceed to process 404 to check the access credentials specific to the requesting end users for accessing the embodiment system 125. If these access credentials are present and valid, the requesting end users may be deemed as signed-in in 406. Otherwise, if these needed access credentials are not present, or are not valid, the requesting end users may be deemed as not-signed-in in 406. The embodiment system 125 may record the not-signed-in status of the requesting end users in process 408 to guide down-stream processing. If the requesting end users are deemed as signed-in in 406, the end users may be further checked in 410 by the embodiment system 125 to see if the requesting end users are allowed for viewing the requested subscribed contents. If the requesting end users are allowed for viewing the requested subscribed contents, the embodiment system 125 may record the appropriate valid user statuses of the requesting end users in process 414 to facilitate further processing of the corresponding requests for subscribed contents. If the requesting end users are deemed as not allowed for viewing the requested subscribed contents, the viewing-denied statuses for corresponding requesting end users may be recorded in 412 by the embodiment system 125 to guide next stage processing of the corresponding requests.

Figure 5:
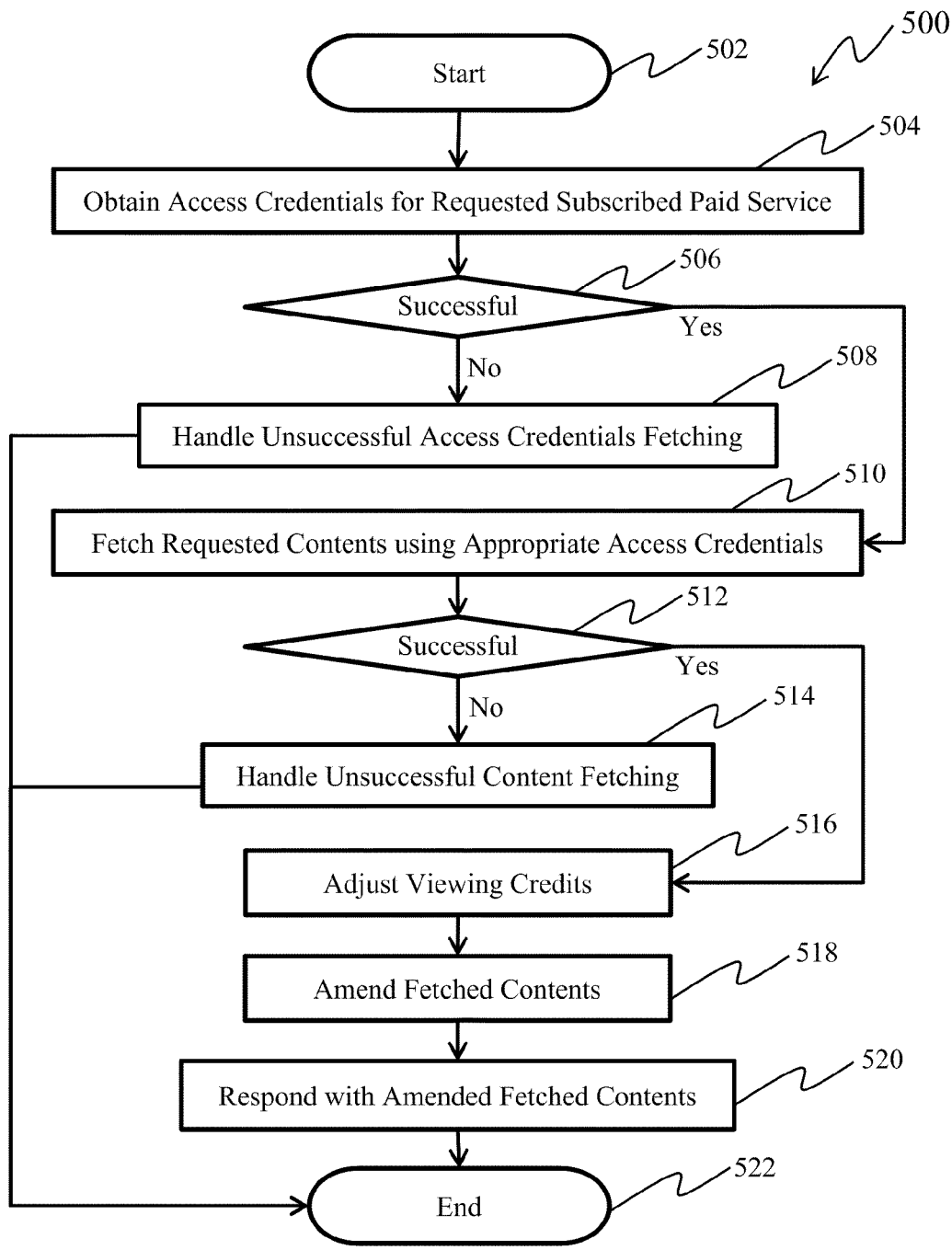
FIG. 5 is a flowchart showing a process of serving the requests for paid subscribed contents from valid end users.

Referring next to FIG. 5, an example processing flow for serving the requests from valid users for subscribed contents is depicted in flowchart 500. The embodiment system 125 may start the processing at 502. In process 504, the access credentials, which may be in the form of HTTP cookies, for accessing the requested subscribed content sources by the embodiment system 125 may be fetched from system data stores. If such access credentials are not present or are expired, the embodiment system 125 may perform automatic sign-in process to obtain the needed access credentials, which may be in the form of HTTP cookies, and store them into system data stores for current and subsequent uses. These access credentials may be updated from time to time with automatic sign-in processes. Also pre-agreement with the providers of the subscribed contents sources may be used for the generation and maintenance of these access credentials by the embodiment system 125. Subscriptions may also be made in advance at the subscribed content sources for obtaining the access credentials for the embodiment system 125 to be able to successfully fetch subscribed contents from the corresponding subscribed contents sources. The status of access credential fetching may be discerned in 506. If the access credential fetching is not successful, user requests may be served in process 508, handling the situation that no valid access credentials can be obtained for the embodiment system 125 to access the corresponding requested subscribed content sources. If the access credential fetching is deemed to be successful in 506, the embodiment system 125 may, in process 510, fetch the requested subscribed contents from the corresponding requested subscribed content sources using the corresponding access credentials. The fetching status for the requested subscribed content may be discerned in 512. If the fetching for the requested subscribed contents is deemed unsuccessful in 512, the requests may further be processed in process 514, handling the situation of unsuccessful subscribed content fetching. When the fetching of the requested subscribed contents is deemed to be successful in 512, the content rates for the requested subscribed contents may be looked up from system data stores, the viewing credits of the requesting end users may be adjusted accordingly and recorded into system data stores in process 516. In process 518, the fetched subscribed contents are amended before passing to end users. To avoid end users from obtaining the access credentials of the embodiment system 125 for accessing subscribed content source, the HTTP cookies that serve as the access credentials for the embodiment system 125 to be successfully fetching subscribed contents from corresponding subscribed content sources may be removed from the fetched subscribed contents. The URLs in the fetched subscribed contents for direct accessing of the subscribed content sources by the end users may be replaces with appropriate proxy URLs, so that the end users may send the corresponding requests for the corresponding subscribed contents to the embodiment system 125 for the processing as depicted in flowchart 200. Addition user interface elements such as those shown in FIG. 7 through FIG. 10 may also be added to the fetched subscribed contents. The requests from end users may then be served in process 520 with the amended subscribed contents.

Figure 6:
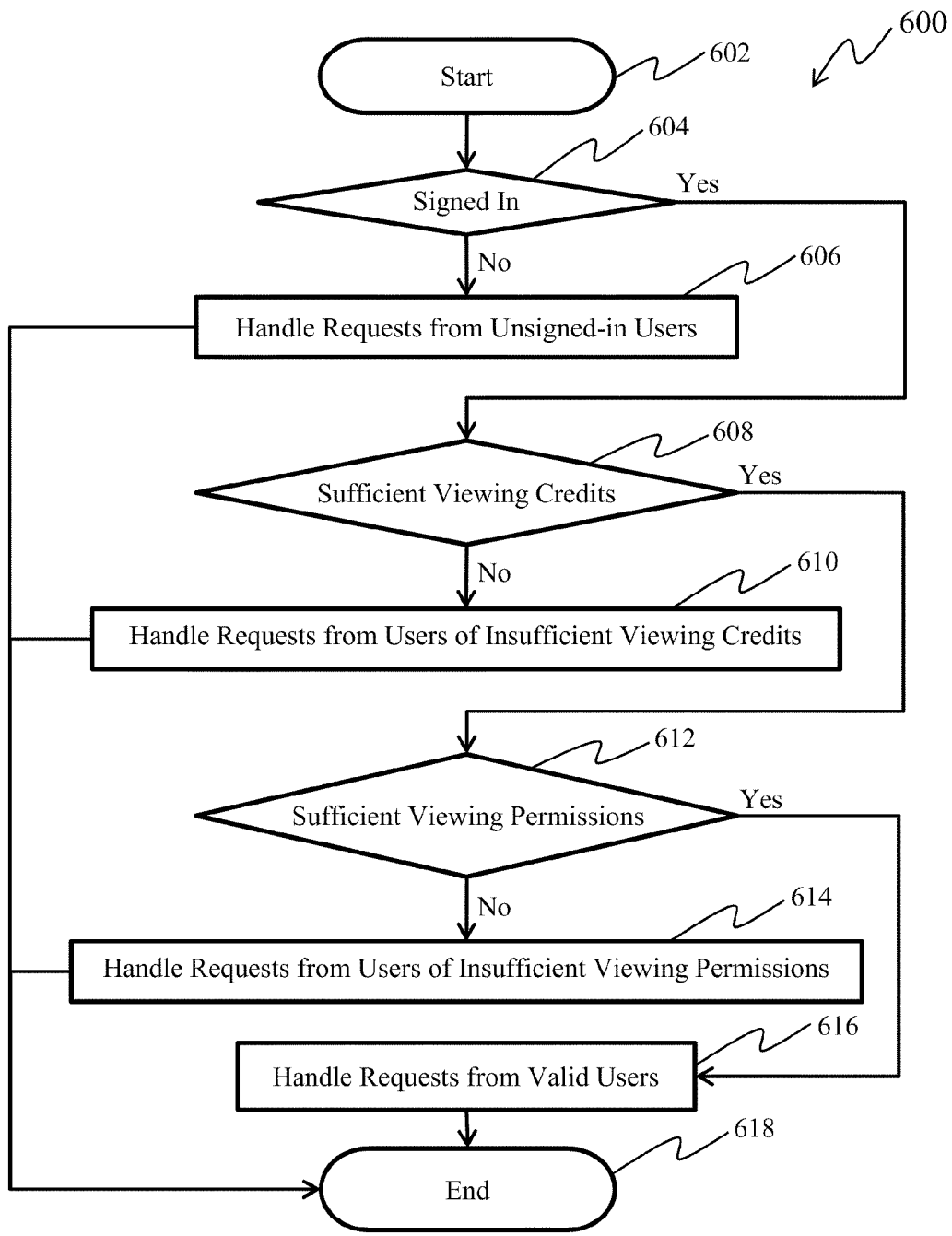
FIG. 6 is a flowchart illustrating a process of handling requests for paid subscribed contents from those end users deemed invalid by process 400 shown in FIG. 4.

The handling of requests from invalid users shown as process 216 in FIG. 2 is now elaborated in flowchart 600 in FIG. 6. With continuing reference to FIG. 6, the embodiment system 125 may start this handling at 602. The sign-in status of requesting end users may be checked in 604. If the requesting end users are not signed in, their requests may be handled in process 606 by the embodiment system 125. In one embodiment the requesting end users may be informed that signing-in is required. If the end users are deemed as signed-in in 604, the end users may further be checked in 608 whether they have sufficient viewing credits for the requested subscribed contents. If the requesting end users do not have sufficient viewing credits for the requested subscribed contents, their requests may be handled in process 610 by the embodiment system 125. The requesting end users may be informed that additional funding to their viewing accounts is required for the requested subscribed contents. If the requesting end users are deemed as having sufficient viewing credits for the requested subscribed contents in 608, they may be further checked in 612 to see if they have sufficient viewing permissions for the requested subscribed contents. The viewing permissions may include age limit, security clearance status, and nationality requirement etc. If the requested users are deemed in 612 as not having sufficient viewing permissions for the requested subscribed contents, their requests may be served in process 614. In process 614, the requesting end users may be informed that they do not have needed permissions for viewing the requested subscribed contents. If the end users are determined in 612 as having sufficient viewing permissions, their requests for subscribed contents may be served in 616, with detailed processing elaborated in flowchart 500 in FIG. 5.

Figure 7:
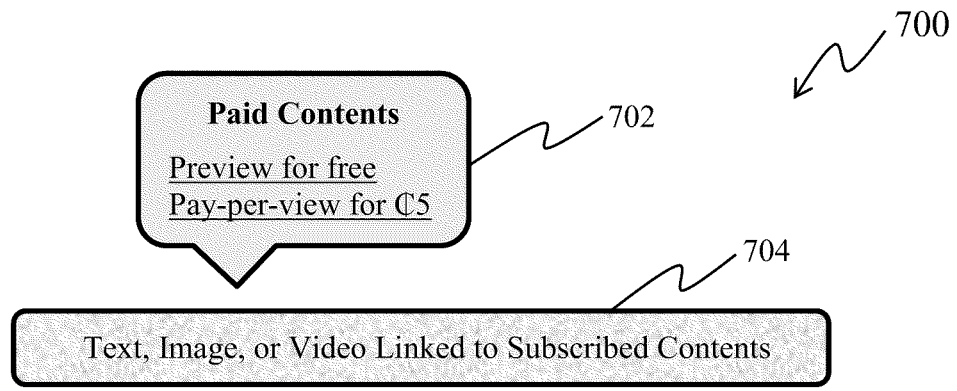
FIG. 7 is a diagram showing of one implementation of user interface elements in the form of HTML links in tooltips for allowing end users to access corresponding subscribed contents via an embodiment system of present invention.

Referring now to FIG. 7, diagram 700 illustrates an exemplary user interface addition in one embodiment of present invention for facilitating end users to request corresponding subscribed contents through the embodiment system 125. When responding with fetched contents to the requests from end users, the embodiment system 125 may amend the fetched contents such that, upon mouse-over or mouse-click of an HTML link 704 which points to further subscribed contents, a tooltip box 702 may pop up giving end users activate-able choices for either previewing corresponding subscribed content for free, or for pay-per-viewing corresponding full subscribed contents for certain amount of viewing credits. These activate-able choices may be in the form of HTML links pointing to the embodiment system 125 in FIG. 1 with the URLs for the targeted subscribed contents embedded. It is to be understood by those skilled that these HTML links described here may also be implemented as HTML menu choices, buttons and other activate-able HTLM elements.

Figure 8:
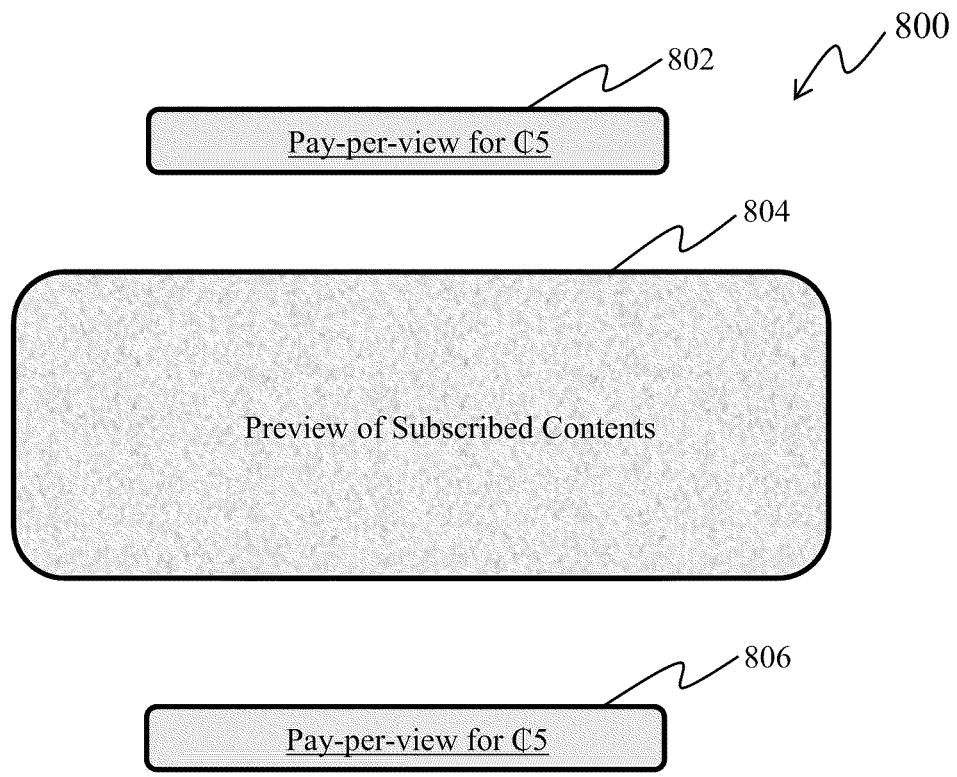
FIG. 8 is a diagram showing of one implementation of user interface elements in the form of HTML links shown in adjacent to the preview of subscribed contents for allowing end users to request the corresponding full subscribed contents via an embodiment system of present invention.

Referring next to FIG. 8, another exemplary user interface addition in one embodiment of present invention is shown in diagram 800. When presenting the preview 804 for requested subscribed contents to the requesting end users, user interface elements such as links 802 and 806 may be inserted above and below the preview 804 of the requested subscribed contents. The associated URLs of these links 802 and 804 are composed such that, upon activation of these links, the requests for the full subscribed contents corresponding to the preview 804 may be sent to the embodiment system 125 for the processing as depicted in flowchart 200 in FIG. 2. It is to be understood by those skilled that these HTML links described here may also be implemented as HTML menu choices, buttons and other activate-able HTLM elements.

Figure 9:
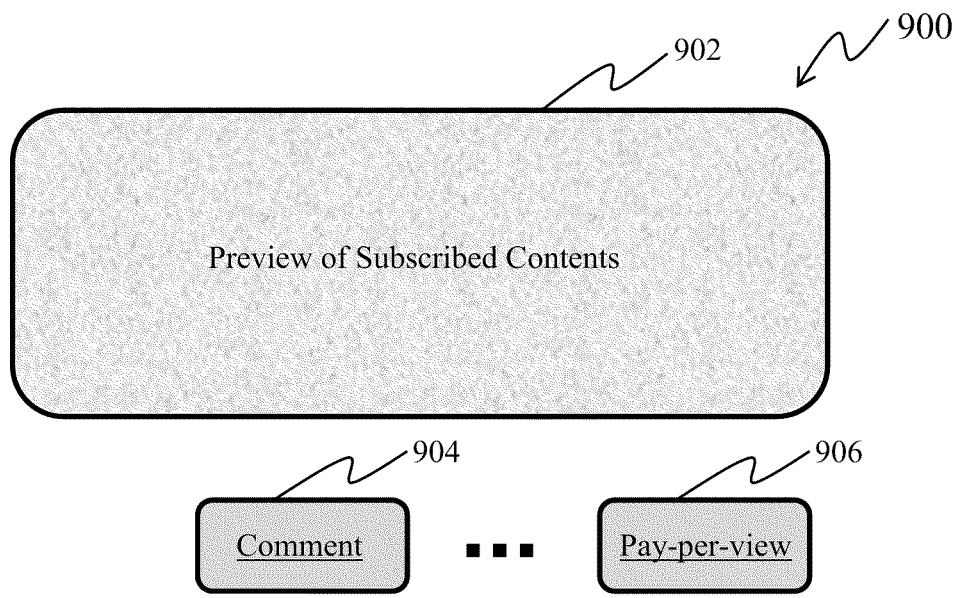
FIG. 9 is a diagram showing of one implementation of user interface elements in the form of HTML buttons in preview pages for allowing end users to request corresponding full subscribed contents via an embodiment system of present invention.

Referring further to FIG. 9, another exemplary of user interface addition in one embodiment of present invention is shown in diagram 900. When presenting the preview 902 of the requested subscribed contents to the requesting end users, user interface element such as HTML button 906 may be inserted above or below the preview 902 of the requested subscribed contents. Upon activation of such button 906, the end users may send the requests for the full subscribed contents corresponding to the preview 902 to the embodiment system 125 for the processing as depicted in flowchart 200 in FIG. 2. It is to be understood by those skilled that HTML button 906 described here may also be implemented as HTML menu choices, links and other activate-able HTLM elements.

Figure 10:
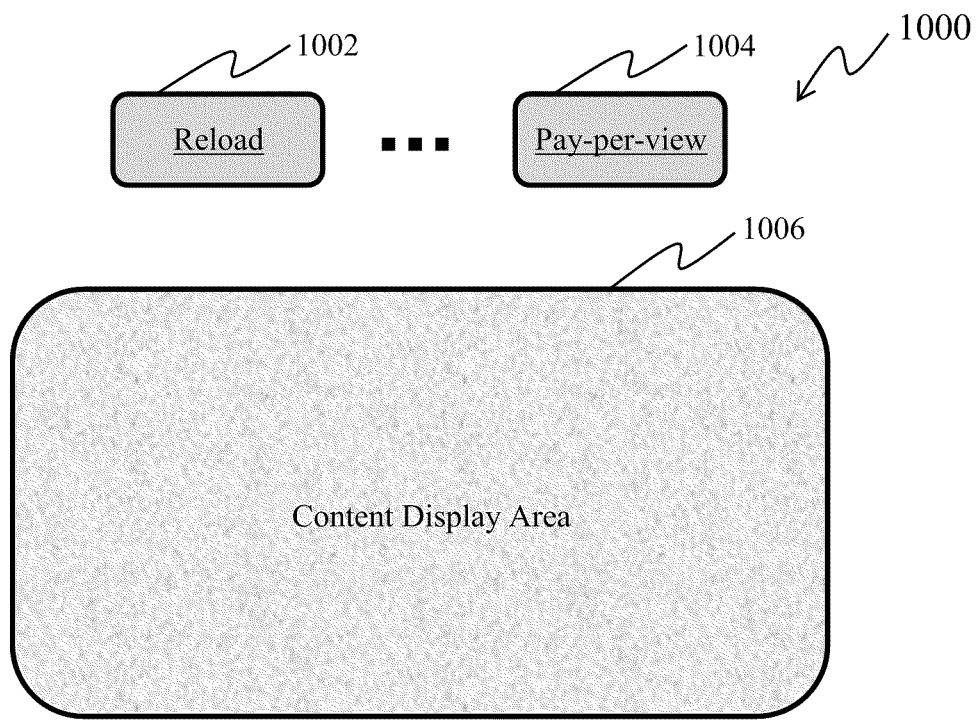
FIG. 10 is a diagram showing of one implementation of user interface elements in the form of browser toolbar buttons for allowing end users to request corresponding full subscribed contents via an embodiment system of present invention.

With continuing reference to FIG. 10, yet another exemplary addition of user interface in one embodiment of present invention is shown in diagram 1000 for facilitating end users to request related subscribed contents through the embodiment system 125. In this example, the end users may be given a browser button 1004, which upon activation, requests for the full subscribed contents corresponding to what has been shown in the browser content display area 1006 may be sent to the embodiment system 125 for the processing as depicted in flowchart 200 in FIG. 2. It is to be understood by those skilled that the browser button 1004 described here may also be implemented as browser menu choices.

Throughout this disclosure, certain references have been made to the internet. Those skilled in the art will appreciate that this disclosure is not limited to the internet, but also encompasses any global communications network now known or that may become known. Further, reference is made to the use of web pages. It is to be understood by those skilled in the art that the disclosure is not meant to be limited to web pages, but instead is meant to encompass any type of electronic publication such as, for example, email, ebooks, instant messages, mobile media messages, etc.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated, and vice versa. Therefore, it is understood that the invention is not to be limited to the specific embodiments disclosed, and that modifications and embodiments are intended to be included within the scope of the appended claims.

What is claimed is:

1. A computer system for serving end user requests for subscribed contents from multiple subscribed content sources without the need of end user subscribing and signing in at each individual subscribed content source the system comprising:
    at least one global communication network connection with at least one end user who sends at least one request for subscribed contents from at least one subscribed content source;
    at least one global communication network connection with at least one subscribed content source;
    at least one data store storing sign-in credentials used by the system for authenticating end users;
    at least one computer server creating system subscriptions of third party contents and obtaining initial credentials for accessing subscribed contents via said system subscriptions;
    at least one computer server maintaining the validity of said credentials for accessing said subscribed contents via said system subscriptions through generally periodic sign-in processes at subscribed content sources and updating of said credentials accordingly;
    at least one data store storing said credentials used by the system for accessing subscribed contents via said system subscriptions;
    at least one computer server for receiving request from at least one end user for subscribed contents;
    at least one computer server for forwarding requests for subscribed contents to corresponding subscribed content sources along with said credentials for accessing said subscribed contents via said system subscriptions;
    at least one computer server for fetching requested subscribed contents from corresponding subscribed content sources via said system subscriptions;
    and at least one computer server forwarding the requested subscribed contents fetched from subscribed content sources via said system subscriptions to corresponding requesting end users after proper amendment of said fetched contents to strip off credential for accessing subscribed contents via said system subscriptions and to replace global communication addresses with addresses for accessing subscribed contents via said system subscriptions through said computer system.

2. A computer system according to claim 1 wherein appropriate access credentials for accessing subscribed content sources by the system are retrieved from the data stores in the system, and the retrieved appropriate access credentials are sent by the system to the sources of requested subscribed contents when the requests from end users for subscribed contents are forwarded by the system to the sources of requested subscribed contents.

3. A computer system according to claim 2 wherein the access credentials for accessing the sources of requested subscribed contents by the system are removed from the fetched subscribed contents before the fetched subscribed contents are forwarded by the system to corresponding requesting end users.

4. A computer system according to claim 3 wherein the requests from end users for subscribed contents are forwarded to appropriate subscribed content sources when the requesting end users are authenticated to be valid users with required permissions.

5. A computer system according to claim 4 wherein the required permissions of authenticated end users for the system to forward the requests for subscribed contents to appropriate subscribed content sources comprises sufficient viewing credits.

6. A computer system according to claim 5 wherein the viewing credits of the authenticated requesting end users are adjusted appropriately according to the content rates known to the system and the serving status of the requested subscribed contents.

7. A computer system according to claim 6 wherein the fetched subscribed contents are further amended by replacing the global communication network addresses for accessing subscribed content sources directly by end users with corresponding global communication network addresses for accessing subscribed content sources indirectly by end users via the system before the fetched subscribed contents are forwarded by the system to the corresponding requesting end users.

8. A computer system according to claim 7 wherein the fetched subscribed contents are further amended with additional user interface elements for end users to send requests for corresponding subscribed contents upon activation of the aforementioned user interface elements.

9. A computer system according to claim 8 wherein the fetched subscribed contents are further amended with additional user interface elements for end users to send requests for corresponding free preview of subscribed contents upon activation of the aforementioned user interface elements.

10. A computer system according to claim 9 wherein the access credentials for accessing the sources of subscribed contents by the system are obtained with pre-agreements between the system and the subscribed content sources.

11. A computer system according to claim 1 wherein appropriate access credentials for accessing subscribed content sources by the system are retrieved from the data stores in the system, and the retrieved appropriate access credentials are sent by the system in the form of HTTP cookies to the sources of requested subscribed contents when the requests from end users for subscribed contents are forwarded by the system to the sources of requested subscribed contents.

12. A computer system according to claim 11 wherein the access credentials in the form of HTTP cookies for accessing the sources of requested subscribed contents by the system are removed from the fetched subscribed contents before the fetched subscribed contents are forwarded by the system to corresponding requesting end users.

13. A computer system according to claim 12 wherein the requests from end users for subscribed contents are forwarded to appropriate subscribed content sources when the requesting end users are authenticated to be valid users with required permissions.

14. A computer system according to claim 13 wherein the required permissions of authenticated end users for the system to forward the requests for subscribed contents to appropriate subscribed content sources comprises sufficient viewing credits.

15. A computer system according to claim 14 wherein the viewing credits of the authenticated requesting end users are adjusted appropriately according to the content rates known to the system and the serving status of the requested subscribed contents.

16. A computer system according to claim 15 wherein the fetched subscribed contents are further amended by replacing the URLs for accessing subscribed content sources directly by end users with corresponding URLs for accessing subscribed content sources indirectly by end users via the system before the fetched subscribed contents are forwarded by the system to the corresponding requesting end users.

17. A computer system according to claim 16 wherein the fetched subscribed contents are further amended with additional user interface elements in the form of at least one of HTML link and HTML button for end users to send requests for corresponding subscribed contents upon activation of the aforementioned user interface elements.

18. A computer system according to claim 17 wherein the fetched subscribed contents are further amended with additional user interface elements in the form of at least one of HTML link and HTML button for end users to send requests for corresponding free preview of subscribed contents upon activation of the aforementioned user interface elements.

19. A computer system according to claim 18 wherein the access credentials in the form of HTTP cookie values for accessing the sources of subscribed contents by the system are updated from time to time and are stored in at least one data store in the system.

20. A computer system according to claim 19 wherein the updating of access credentials for accessing the sources of subscribed contents by the system are accomplished via automatic signing in at the sources of subscribed contents and retaining the appropriate HTTP cookie values received from the corresponding subscribed content sources.

21. A computer system according to claim 18 wherein the access credentials in the form of HTTP cookies for accessing the sources of subscribed contents by the system are obtained with pre-agreements between the system and the subscribed content providers.

22. A computer implemented method for serving end user requests for subscribed contents from multiple subscribed content sources without the need of end user subscribing and signing in at each individual subscribed content source and without the need of content providers to change their existing schemes of subscription authentication, authorization and billing, the method comprising:
    making at least one global communication network connection with at least one end user who sends at least one request for subscribed contents from at least one subscribed content source;
    making at least one global communication network connection with at least one subscribed content source;
    storing in at least one data store sign-in credentials used by the system for authenticating end users;
    creating system subscriptions of third party contents and obtaining initial credentials for accessing subscribed contents via said system subscriptions using at least one computer server;
    maintaining the validity of said credentials for accessing said subscribed contents via said system subscriptions through generally periodic automatic sign-in processes at subscribed content sources and updating of said credentials accordingly using at least one computer server;
    storing in at least one data store said credentials used by the system for accessing subscribed contents via said system subscriptions;
    receiving requests from at least one end user for subscribed contents along with said credentials for accessing subscribed contents via system subscriptions using at least one computer server;
    forwarding requests for subscribed contents from corresponding subscribed content sources via said system subscriptions using at least one computer server;
    fetching requested subscribed contents from corresponding subscribed content sources via said system subscriptions using at least one computer server; and
    forwarding requested subscribed contents fetched from subscribed content sources via said system subscriptions to corresponding requesting users using at least one computer server after proper amendment of the said fetched contents to strip off credentials for accessing subscribed contents via said system subscriptions and to replace global communication addresses with addresses for accessing subscribed contents via said system subscriptions through said computer system.

23. A computer implemented method according to claim 22 wherein appropriate access credentials for accessing subscribed content sources by a system implementing the method are retrieved from the data stores in the system, and the retrieved appropriate access credentials are sent by the system to the sources of requested subscribed contents when the requests from end users for subscribed contents are forwarded by the system to the sources of requested subscribed contents.

24. A computer implemented method according to claim 23 wherein the access credentials for accessing the sources of requested subscribed contents by the system are removed from the fetched subscribed contents before the fetched subscribed contents are forwarded by the system to corresponding requesting end users.

25. A computer implemented method according to claim 24 wherein the requests from end users for subscribed contents are forwarded to appropriate subscribed content sources when the requesting end users are authenticated to be valid users with required permissions.

26. A computer implemented method according to claim 25 wherein the required permissions of authenticated end users for the system to forward the requests for subscribed contents to appropriate subscribed content sources comprises sufficient viewing credits.

27. A computer implemented method according to claim 26 wherein the viewing credits of the authenticated requesting end users are adjusted appropriately according to the content rates known to the system and the serving status of the requested subscribed contents.

28. A computer implemented method according to claim 27 wherein the fetched subscribed contents are further amended by replacing the global communication network addresses for accessing subscribed content sources directly by end users with corresponding global communication network addresses for accessing subscribed content sources indirectly by end users via the system before the fetched subscribed contents are forwarded by the system to the corresponding requesting end users.

29. A computer implemented method according to claim 28 wherein the fetched subscribed contents are further amended with additional user interface elements for end users to send requests for corresponding subscribed contents upon activation of the aforementioned user interface elements.

30. A computer implemented method according to claim 29 wherein the fetched subscribed contents are further amended with additional user interface elements for end users to send requests for corresponding free preview of subscribed contents upon activation of the aforementioned user interface elements.

31. A computer implemented method according to claim 30 wherein the access credentials for accessing the sources of subscribed contents by the system are obtained with pre-agreements between the system and the subscribed content sources.

32. A computer implemented method according to claim 22 wherein appropriate access credentials for accessing subscribed content sources by a system implementing the method are retrieved from the data stores in the system, and the retrieved appropriate access credentials are sent by the system in the form of HTTP cookies to the sources of requested subscribed contents when the requests from end users for subscribed contents are forwarded by the system to the sources of requested subscribed contents.

33. A computer implemented method according to claim 32 wherein the access credentials in the form of HTTP cookies for accessing the sources of requested subscribed contents by the system are removed from the fetched subscribed contents before the fetched subscribed contents are forwarded by the system to corresponding requesting end users.

34. A computer implemented method according to claim 33 wherein the requests from end users for subscribed contents are forwarded to appropriate subscribed content sources when the requesting end users are authenticated to be valid users with required permissions.

35. A computer implemented method according to claim 34 wherein the required permissions of authenticated end users for the system to forward the requests for subscribed contents to appropriate subscribed content sources comprises sufficient viewing credits.

36. A computer implemented method according to claim 35 wherein the viewing credits of the authenticated requesting end users are adjusted appropriately according to the content rates known to the system and the serving status of the requested subscribed contents.

37. A computer implemented method according to claim 36 wherein the fetched subscribed contents are further amended by replacing the URLs for accessing subscribed content sources directly by end users with corresponding URLs for accessing subscribed content sources indirectly by end users via the system before the fetched subscribed contents are forwarded by the system to the corresponding requesting end users.

38. A computer implemented method according to claim 37 wherein the fetched subscribed contents are further amended with additional user interface elements in the form of at least one of HTML link and HTML button for end users to send requests for corresponding subscribed contents upon activation of the aforementioned user interface elements.

39. A computer implemented method according to claim 38 wherein the fetched subscribed contents are further amended with additional user interface elements in the form of at least one of HTML link and HTML button for end users to send requests for corresponding free preview of subscribed contents upon activation of the aforementioned user interface elements.

40. A computer implemented method according to claim 39 wherein the access credentials in the form of HTTP cookie values for accessing the sources of subscribed contents by the system are updated from time to time and are stored in at least one data store in the system.

41. A computer implemented method according to claim 40 wherein the updating of access credentials for accessing the sources of subscribed contents by the system are accomplished via automatic signing in at the sources of subscribed contents and retaining the appropriate HTTP cookie values received from the corresponding subscribed content sources.

42. A computer implemented method according to claim 39 wherein the access credentials in the form of HTTP cookies for accessing the sources of subscribed contents by the system are obtained with pre-agreements between the system and the subscribed content providers.

* * * * *